United States Patent [19]

Abali et al.

[11] Patent Number: 5,721,820
[45] Date of Patent: Feb. 24, 1998

[54] SYSTEM FOR ADAPTIVELY ROUTING DATA IN SWITCHING NETWORK WHEREIN SOURCE NODE GENERATES ROUTING MESSAGE IDENTIFYING ONE OR MORE ROUTES FORM SWITCH SELECTS

[75] Inventors: Bulent Abali, New York, N.Y.; Craig Brian Stunkel, Bethel, Conn.

[73] Assignee: International Business Machines Corporation, Armonk, N.Y.

[21] Appl. No.: 526,734

[22] Filed: Sep. 11, 1995

[51] Int. Cl.⁶ ............................................. G06F 13/14
[52] U.S. Cl. ............................ 395/200.15; 395/200.16; 370/235; 370/356; 370/389; 370/437; 370/465
[58] Field of Search ............................ 370/392, 393, 370/396, 398, 400, 422, 427, 235, 356, 389, 437, 465; 395/200.15, 200.16

[56] References Cited

U.S. PATENT DOCUMENTS

| | | | |
|---|---|---|---|
| 4,038,638 | 7/1977 | Hwang | 340/166 R |
| 4,679,189 | 7/1987 | Olson et al. | 370/396 |
| 4,696,000 | 9/1987 | Payne, III | 370/353 |
| 4,813,038 | 3/1989 | Lee | 370/390 |
| 4,993,018 | 2/1991 | Hajikano et al. | 370/392 |
| 5,001,702 | 3/1991 | Teraslinna et al. | 370/392 |
| 5,132,965 | 7/1992 | Zhang | 370/393 |
| 5,199,027 | 3/1993 | Barri | 370/392 |
| 5,218,601 | 6/1993 | Chujo et al. | 370/228 |
| 5,345,229 | 9/1994 | Olnowich et al. | 340/825.8 |
| 5,355,364 | 10/1994 | Abali | 370/54 |
| 5,371,733 | 12/1994 | Denneau et al. | 370/17 |
| 5,371,735 | 12/1994 | Denneau et al. | 370/54 |
| 5,453,978 | 9/1995 | Sethu et al. | 370/254 |
| 5,471,467 | 11/1995 | Johann | 370/238 |
| 5,471,623 | 11/1995 | Napolitano, Jr. | 395/200.03 |
| 5,600,638 | 2/1997 | Bertin et al. | 370/351 |

OTHER PUBLICATIONS

C.B. Stunkel et al., "Architecture and implementation of Vulcan," Proc. 8th Int. Parallel Processing Synp., pp. 268–374, Apr. 1994.

B. Abali et al., "Routing algorithms for IBM SP1," Lecture Notes in Computer Science, Springer–Verlag, vol. 853, pp. 161–175, 1994.

C. B. Stunkel et al.,"The SP2 High–Performance Switch" IBM Systems Journal, vol. 3, #2, 1995, pp. 185–190.

Robert Y. Hou, Jai Menon, Yale N. Patt (IEEE 1993) Balancing I/O Response Time and Disk Rebuild Time in a RAID 5 Disk Array.

*Primary Examiner*—Thomas C. Lee
*Assistant Examiner*—Ki S. Kim

[57] ABSTRACT

A method for adaptive routing of messages in a computer network. The method provides adaptive source routing by generating at a source node a routing message describing a plurality of allowable paths via which data message can reach a desired destination. The data message and the routing message are sent by the source to a first switch, and the routing message is evaluated by control logic to determine if an available, allowable path exists. If so, the data message and routing message are sent via that path to the destination.

20 Claims, 4 Drawing Sheets

MESSAGE PACKET FORMAT

5,721,820

SYSTEM FOR ADAPTIVELY ROUTING DATA IN SWITCHING NETWORK WHEREIN SOURCE NODE GENERATES ROUTING MESSAGE IDENTIFYING ONE OR MORE ROUTES FORM SWITCH SELECTS

FIELD OF THE INVENTION

The invention relates to electronic communication, and more particularly to sending electronic messages from a source node through a network of a plurality of switches and links to a destination.

BACKGROUND OF THE INVENTION

Routing in an interconnection network can be classified as adaptive or non-adaptive. In non-adaptive (or oblivious) routing, there is a fixed routing decision at each intermediate switch along a path between a source node and a destination node-one output port is selected for message packet forwarding. Adaptive routing schemes allow more than one choice of output ports.

In adaptive routing networks, message packets make use of multiple paths between source-destination node pairs. Switches alleviate the congestion problem by sending packets via less busy alternate routes. This requires that the adaptive routing switch know which of its outputs lead to the intended destination. For this reason, a common requirement for all adaptive networks is a regular, simply described network topology such as a 2-D mesh. The switches then have an implicit knowledge of the topology, and therefore can route packets using shortest paths. For example, in a 2-dimensional mesh topology, each switch knows that a node at the upper right corner of the network can be reached by sending a packet either in the North or East direction. In an alternative approach, routing tables may be put in each switch; however, routing tables occupy valuable real estate on the switch chips.

Another means of classifying routing is as source-based or destination-based. In source routing, the packet route information is embedded into the packet by the source node. For destination-based routing, either the destination or the positional difference between the current switch and the destination is embedded into the packet. The switch element must therefore "know" how to route to the destination using this information.

In the source-based routing scheme, unlike destination-based routing, switches need not know the network topology; the source processor determines the route and encodes the routing instructions in the packet header. Switches then follow these instructions to forward the packet to its destination. Thus, switches do not make any intelligent routing decisions. For example, in the SP2 multistage network, which comprises 8×8 switches, the packet header initially contains 3-bit routing words $R_0, R_1, \ldots, R_{n-1}$. Each word indicates a switch port numbered from 0 to 7. The source processor determines the route and puts respective words in the header. As the message packet proceeds in the network, each switch examines the first word and forwards the packet through the indicated output port. The switch also strips off that first word before forwarding the packet to the next level in the network. Thus the packet contains no routing information upon arriving at its ultimate destination. In SP2, routing headers are computed only once and then kept in a route table in each processor node. Keeping route tables in processors is inexpensive since processors already have large memories. The route table approach enables routing to be done in a topology independent fashion. Any network topology is possible to implement without having to change the hardware or the routing algorithms, provided that cost, performance, and deadlock constraints are satisfied. Furthermore, faulty links and switches are handled easily by modifying routing tables. In that respect, source routing is more flexible than adaptive routing. However, a disadvantage of the source routing scheme is non-adaptiveness; packets may get blocked more often while traversing the network since they cannot make adaptive routing decisions.

Although adaptive networks have been constructed and proposed, they have all been destination-based adaptive networks. This invention combines source-based and adaptive routing principles.

SUMMARY OF THE INVENTION

In this invention, we employ the advantages of the adaptive routing and the source routing schemes to create a new routing scheme which we call "adaptive source routing" (ASR). The ASR scheme is adaptive, but unlike other adaptive schemes, it permits any network topology to be used. In ASR, the degree of adaptivity of each message packet is determined at the source processor. Every packet can be routed in a fully adaptive (message can be routed via any one of all possible routes), partially adaptive (message can be routed via one of a subset of all possible routes) or non-adaptive (message can be routed via only one of all the possible routes) manner, all within the same network at the same time.

One aspect of the invention is a system for routing a data message from a first node, via a network of switches each having a plurality of ports, to a second node, comprising:

means in the first node for generating a routing message identifying one or more selected paths from among all possible paths via which the data message can be routed to the second node;

means in the first node for transmitting the routing message and data message to a switch in a first stage of the network;

means in each switch for selecting, from among the one or more selected paths identified in the routing message, an available path;

means in each switch for transmitting the data message and routing message to the second node via the path.

DESCRIPTION OF THE PREFERRED EMBODIMENTS

Figure 1:
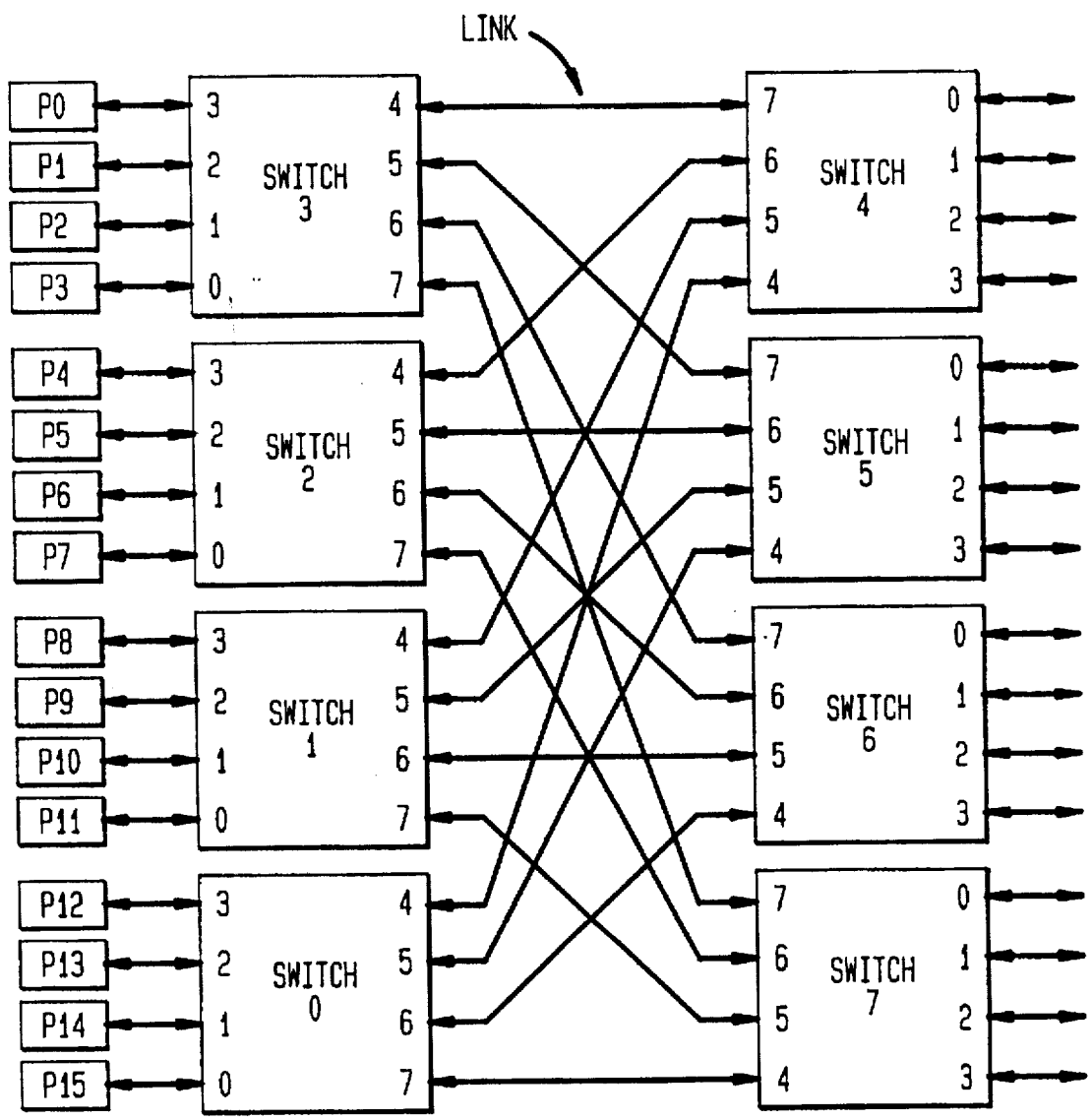
FIG. 1 is a block diagram of an example of a communication network.

FIG. 1 is a block diagram of an example of a communication network. In this example, P0 through P15 represent the processors that both send and receive packets. The communication network further comprises switches 0 through 7. Each switch has 8 ports numbered 0 through 7.

Each switch can route packets received from any one of its 8 ports to any one of its 8 ports.

Each processor is connected to one port of a switch by a link. Similarly, switches are interconnected among themselves by links. In FIG. 1, 16 processors are connected to the left side of the network. The 16 ports on the right side of the network are unused in this example, however, larger networks can be constructed by connecting these links to other processors or other switches. Other ways of constructing networks are possible using switches as building blocks.

Figure 2:
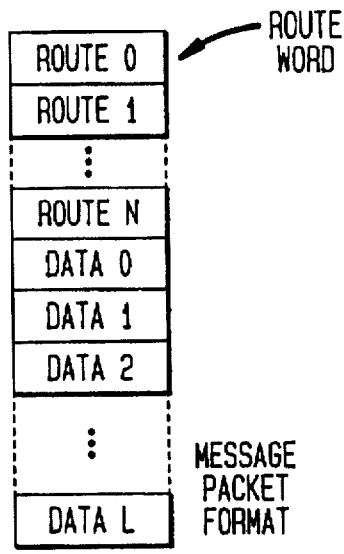
FIG. 2 is an example of a message packet format for use in the network of FIG. 1.

Communication between processors is facilitated by sending and receiving packets through the network. FIG. 2 is an example of a message packet format in accordance with the invention. The message packet comprises a header that encodes routing information, followed by the packet data. Route words in the route header identify the path that the packet will follow. The source processor places the route words in the packet. A switch receiving the packet examines the first route word to determine which output port the packet is to be routed to. The switch deletes the first route word before forwarding the packet to the next network element. Therefore the next route word becomes the first route word, and the switch receiving the packet will use that route word. A packet has no route words left upon arriving at the destination processor.

One skilled in the art will recognize that there are other methods for embedding source-based route words in a packet, and this invention does not depend on the particular method used. For instance, the route words could be preceded by a "route word identifier" that points to the current route word, and instead of removing the first route word in each packet, each switch could increment this identifier.

Figure 3:
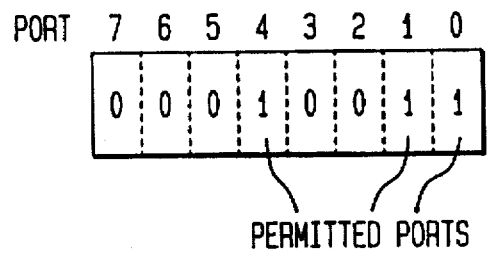
FIG. 3 is an example of a route word format for use in the message packet of FIG. 2.

An important feature of the invention is the definition of the routing words: each routing word indicates a set of possible output ports. In one embodiment, each m-bit routing word has the format $R = r_{m-1} r_{m-2} \ldots r_0$, where m is the number of switch ports. FIG. 3 shows an example route word format for an 8 port switch. Bits that are set to "1" indicate the set of outputs that the switch is permitted to route the packet through. For example, in FIG. 3, the route word is R=00010011, indicating that the switch may route the packet through one of the ports 0, 1, or 4. The switch routes the packet adaptively: when the packet arrives at the switch, the switch will search for an unused port from the set of ports indicated in the first route word, in this example are ports 0, 1, 4. If none of the ports are available then the packet is blocked. The packet cannot proceed until at least one of the ports is cleared.

In the example network of FIG. 1, a packet from P0 to P15 can be sent in 4 different ways: via switches 3-4-0, or 3-5-0, or 3-6-0, or 3-7-0. Therefore, the source processor P0 uses a route header shown in FIG. 4, which indicates to the first switch that the packet may be routed through one of four ports 4 through 7. The next switch must route through port 4, and the last switch must route through port 0, therefore finally arriving at destination processor P15.

The number of distinct paths a packet may follow from source to destination is $$N_{path} = |R_0| * |R_1| * \ldots * |R_{m-2}| * |R_{m-1}|$$

where $|R_i|$ is defined as the number of 1's in the routing word $R_i$. One useful aspect of the invention is that the source processor can control the degree of adaptiveness of each packet by selecting the route words accordingly. For example, by setting only one 1 bit in each route word (i.e. $N_{path}=1$) a packet may be routed in a totally non-adaptive manner. As another example, by setting only a subset of possible 1 bits in each route word, a packet may be restricted to a certain region of the network, yet be routed adaptively within that region.

Figure 5:
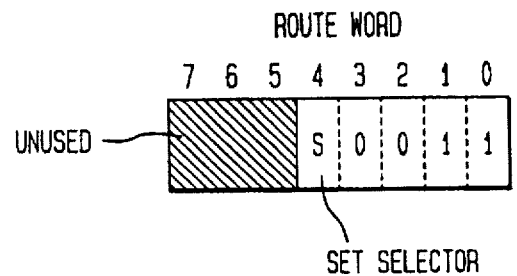

In alternative embodiments of the invention, different definitions of route words may be used. For example, in FIG. 5 a route word specifies only up to 4 ports at a time in an 8 port switch. The set selector bit S specifies one of two possible port sets. If S=0 then bits 0 through 3 of the route word specify ports 0 through 3, respectively. If S=1 then bits 0 through 3 of the route word specify ports 4 through 7, respectively. Therefore, in this embodiment, a packet may be adaptively routed through either the set of ports 0, 1, 2, 3 or through the set of ports 4, 5, 6, 7. The advantage of this scheme is that it frees 3 bits of the 8 bit route word for other possible routing functions.

In an another embodiment, a variant of the embodiment described above may be used. The set selector bit S is eliminated, and the set selection is made implicitly: the bits 0-3 in the route word format refer to the ports on the opposite side of the port that the packet has entered a switch from. For example, if the packet entered a switch from one of ports 0-3, then route bits 0-3 in the format refer to the ports 4-7, respectively. Otherwise if the packet entered a switch from one of ports 4-7, then route bits 0-in the format refer to the ports 0-3, respectively. The advantage of this scheme is that it occupies only 4-bits. In alternative embodiments, other definitions and formats of route words may be used.

One skilled in the art will recognize that it is possible to use multiple route word formats within a packet, and this invention does not depend on the particular method used. For instance, the route words could be preceded by a "route word identifier" that indicates where in the packet header one format ends and the other format starts.

One skilled in the art will also recognize that it is possible to use route words greater or less than 8-bits long, and this invention does not depend on the particular size used.

The source processor prepares message packets (whose format is shown in FIG. 2) for transmission by combining the data and the routing header for the intended destination. Routing headers are stored in a routing table in the source processor's memory, and the source processor obtains the header for the intended destination by a table look-up when preparing a message packet for transmission. The routing table consists of at least one header per destination processor. For example, in FIG. 1 source processor P0 has 15 possible destinations, processors P1 through P15. Therefore, P0's routing table contains 15 routing headers, with one header for each destination.

In the preferred embodiment, a source processor creates its routing table at system initialization time. In alternative embodiments, source processors may create routing tables and headers dynamically, on the fly, as needed, and this invention does not depend on the particular method used. The source processor creates a routing header by a routing algorithm that explores all the possible paths in the network and combines that knowledge to create a header. The routing algorithm makes use of a network topology file which describes how the switching network elements are interconnected. This invention does not depend on a particular routing algorithm used. For the sake of illustration, an algorithm sketch will be given in the following.

Figure 4:
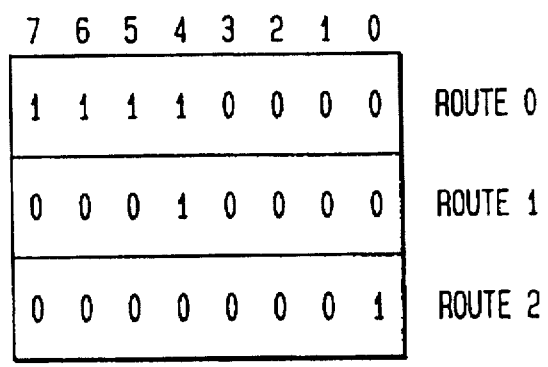
FIGS. 4 and 5 are other examples of route word formats for use in the message packet of FIG. 2.

For example, in FIG. 1 consider the case of determining a route header for transmission from source P0 to destination P15: in the first step of the algorithm all the possible shortest paths from P0 to P15 may be exhaustively searched and found. There are four possible such paths: namely via switches 3-4-0, or 3-5-0, or 3-6-0, or 3-7-0, or described in an alternative way, via switch output ports 4-4-0, or 5-4-0, or 6-4-0, or 7-4-0. In the second step, the routing algorithm can combine the four possible paths to form a route header: it is clear that all four paths use identical output port numbers in the last two switches of the path, namely ports 4 and 0 respectively. However, the four paths use different output port numbers in the first switch in each path, namely ports 4, 5, 6, or 7. Therefore, the first route word of the header encodes ports 4,5,6,7, and the second route word encodes port 4 only and the last route word encodes port 0 only. The resulting routing header for this example is shown in FIG. 4.

One skilled in the art will recognize that many different routing algorithms for creating routing headers and tables may be used, and this invention does not depend on a particular algorithm used.

Figure 6:
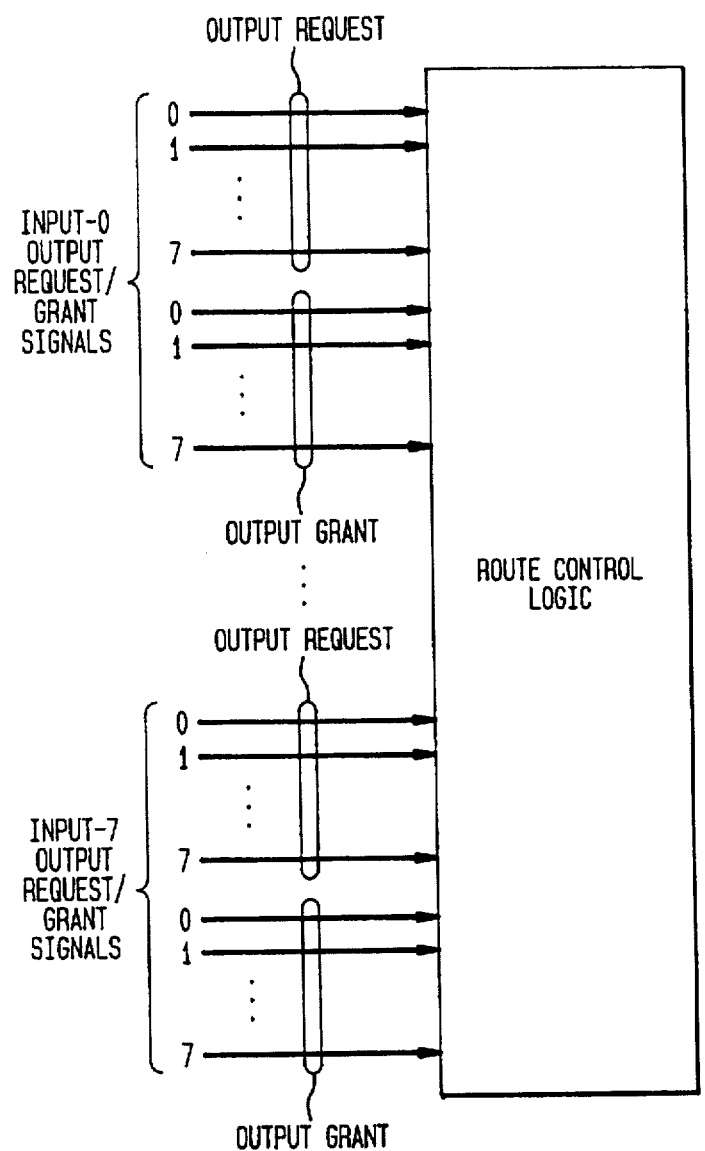
FIG. 6 is a block diagram of route control logic for use in switches in a system in accordance with the invention.
Figure 7:
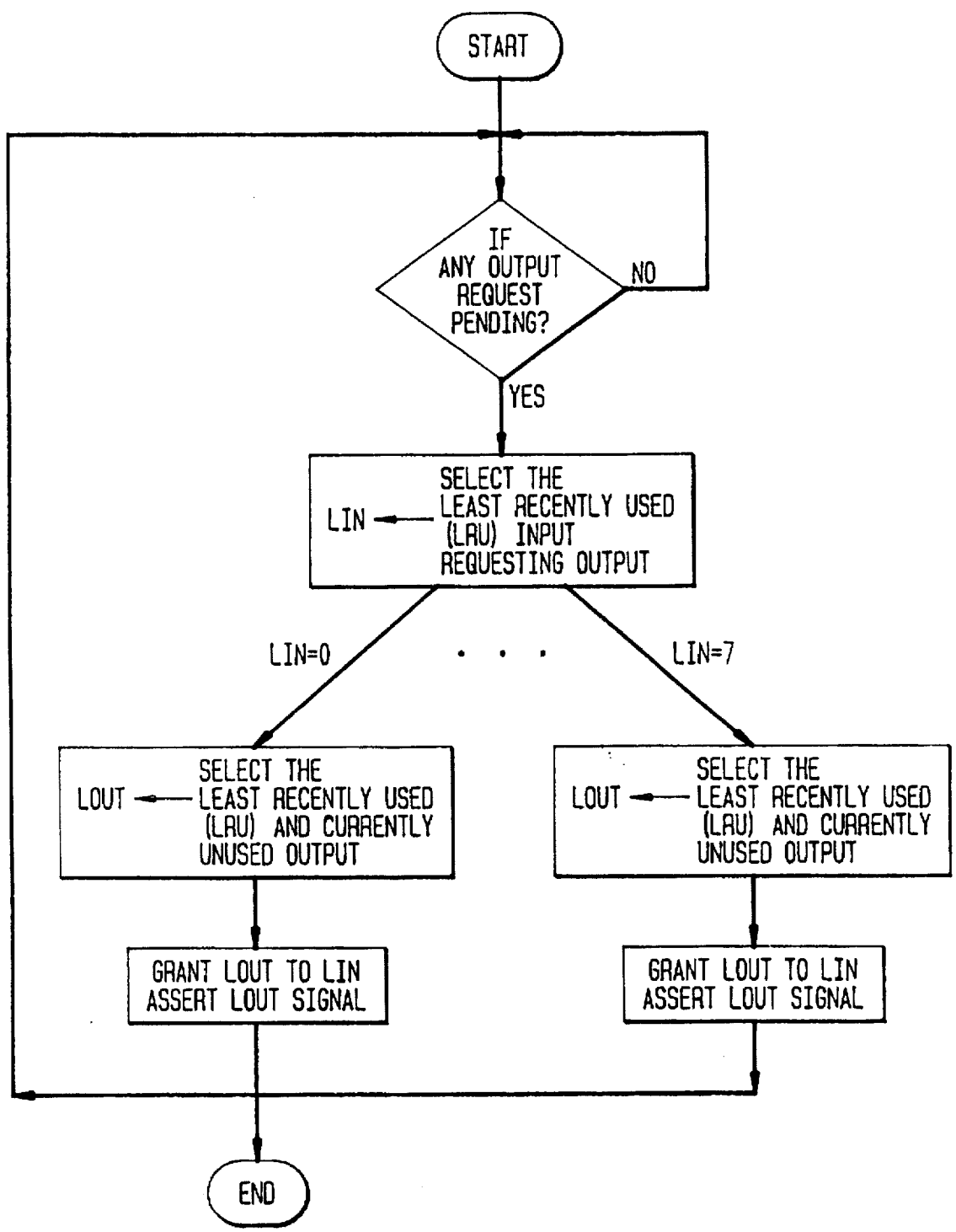
FIG. 7 is a flow diagram describing the logic of FIG. 6.

FIG. 6 shows a block diagram of an embodiment of ROUTE CONTROL LOGIC that can be used in an implementation of the switches shown in FIG. 1. The ROUTE CONTROL LOGIC is a controller circuitry that selects and grants output ports to packets. The logic will be programmed in such a way as to recognize the format of the routing message. A flow chart of the controller operation is presented in FIG. 7, and the details of the control logic can be implemented by one skilled in the art in a straight-forward manner when referring to FIG. 7 and this Detailed Description. A message packet arriving from one of the switch's eight input ports (labelled 0–7 in FIG. 6) presents in its first route word $R_0$ a set of possible output ports signalled to the ROUTE CONTROL LOGIC by a group of eight signals labeled "OUTPUT REQUEST". There may be other packets that arrived from other input ports and waiting for an output port to be granted. These other requests are stored in the logic's memory (not shown), or alternatively in a buffer associated with that input port. The ROUTE CONTROL LOGIC services the input ports one at a time in the preferred embodiment: the selected input port is the least recently used input port for fairness. Then, the ROUTE CONTROL LOGIC examines the OUTPUT REQUEST signals of the selected input port which indicate allowable output ports for routing, as determined by the source node. The ROUTE CONTROL LOGIC selects a currently unused output port from the set of possible outputs. In the event that multiple output ports are available, then the least recently used output port is selected for routing. The ROUTE CONTROL LOGIC grants the selected output port to the packet by asserting one of the eight signals labelled OUTPUT GRANT and the message is transferred via that port. In the event that no allowable output port is available, the output request (routing) message is stored in controller memory until an allowable output port is available.

The ROUTE CONTROL LOGIC of FIG. 6 can be used as the "route logic" in U.S. Pat. No. 5,355,364, issued Oct. 11, 1994 to Bulent Abali, and incorporated herein by reference.

While the invention has been described in particular with respect to preferred embodiments thereof, it will be understood that modifications to the disclosed embodiments can de effected without departing from the spirit and scope of the invention.

We claim:

1. A system for routing a data message from a first node, via a network of switches each having a plurality of ports, to a second node, comprising:

means in the first node for generating a routing message identifying one or more selected paths from among all possible paths via which the data message can be routed to a second node thereby setting a degree of adaptivity associated with the routing of the data message between nodes, the routing message having a plurality of bits which correspond to the plurality of ports;

means in the first node for transmitting the routing message and data message to a switch in a first stage of the network;

means in each switch for selecting, from among the one or more selected paths identified in the routing message, an available path; and means in each switch for transmitting the data message and routing message to the second node via the path.

2. The system of claim 1, wherein the first and second nodes are processors.

3. The system of claim 1, wherein each switch includes a plurality of ports and means for transmitting a message received at any one of the ports to any one of the plurality of ports.

4. The system of claim 3, wherein the routing message and the data message constitute a packet.

5. The system of claim 3, wherein the routing message comprises a plurality of bits, each of the bits corresponding to a different one of the ports in a switch, and wherein the value of the bits determine whether the data message can be routed via the associated port.

6. The system of claim 5, wherein the packet comprises one routing message for each switch through which the data message can be routed.

7. The system of claim 6, further comprising means for each switch identifying which one of the routing messages applies to that switch.

8. The system of claim 3, wherein the routing message comprises a selector bit and a plurality of bits numbering less than the number of ports in the switch, wherein each of the plurality of bits corresponds to a different one of the ports in a subset of the ports when the selector bit is set, and wherein each of the plurality of bits corresponds to a different one of the ports in a second set of the ports when the selector bit is not set, wherein the value of the bits determine whether the data message can be routed via the associated port.

9. The system of claim 3, wherein the routing message comprises a plurality of bits, each bit corresponding to a port in a set of ports that does not include the port that received the routing message, wherein the value of the bits determine whether the data message can be routed via the corresponding port.

10. The system of claim 3, wherein the routing message comprises a plurality of routing words of different formats.

11. A method for routing a data message from a first node to a second node via a multi-stage switching network, comprising:

generating in the first node a routing message describing one or more routes via which the data message can travel from the first node to the second node thereby setting a degree of adaptivity associated with the routing of the data message between nodes;

sending the data message and the routing message to a first switch that is the first switch of each of the one or more routes, the routing message having a plurality of bits which correspond to a plurality of ports of the switch;

evaluating, at the first switch, which of the one or more routes are available; and sending the message to the second node via one or more switches of the available routes.

12. The method of claim 11, further comprising evaluating at each of the one or more switches, which of a plurality of subroutes of the one or more routes are available.

13. The method of claim 11, wherein the source node selects the one or more routes from among all routes via which the data message can travel.

14. The method of claim 13, wherein the source node selects all routes via which the data message can travel.

15. The method of claim 13, wherein the source node selects fewer than all the routes via which the data message can travel.

16. The method of claim 11, wherein the first and second nodes are processors.

17. The method of claim 11, wherein the routing message comprises a plurality of bits, each of the bits corresponding to a different one of the ports in a switch, and wherein the value of the bits determine whether the data message can be routed via the associated port.

18. The method of claim 11, wherein the routing message comprises a selector bit and a plurality of bits numbering less than the number of ports in the switch, wherein each of the plurality of bits corresponds to a different one of the ports in a first subset of the ports when the selector bit is set, and wherein each of the plurality of bits corresponds to a different one of the ports in a second set of the ports when the selector bit is not set, wherein the value of the bits determine whether the data message can be routed via the associated port.

19. The method of claim 11, wherein the routing message comprises a plurality of bits, each bit corresponding to a set of ports that does not include the port in the switch that received the routing message, wherein the value of the bits determine whether the data message can be routed via the corresponding port.

20. The method of claim 11, wherein the routing message comprises a plurality of routing words of different formats.

* * * * *